Oct. 10, 1944.  R. L. HOOD  2,359,734
SPECTROPHOTOMETER AMPLIFIER
Filed July 31, 1942
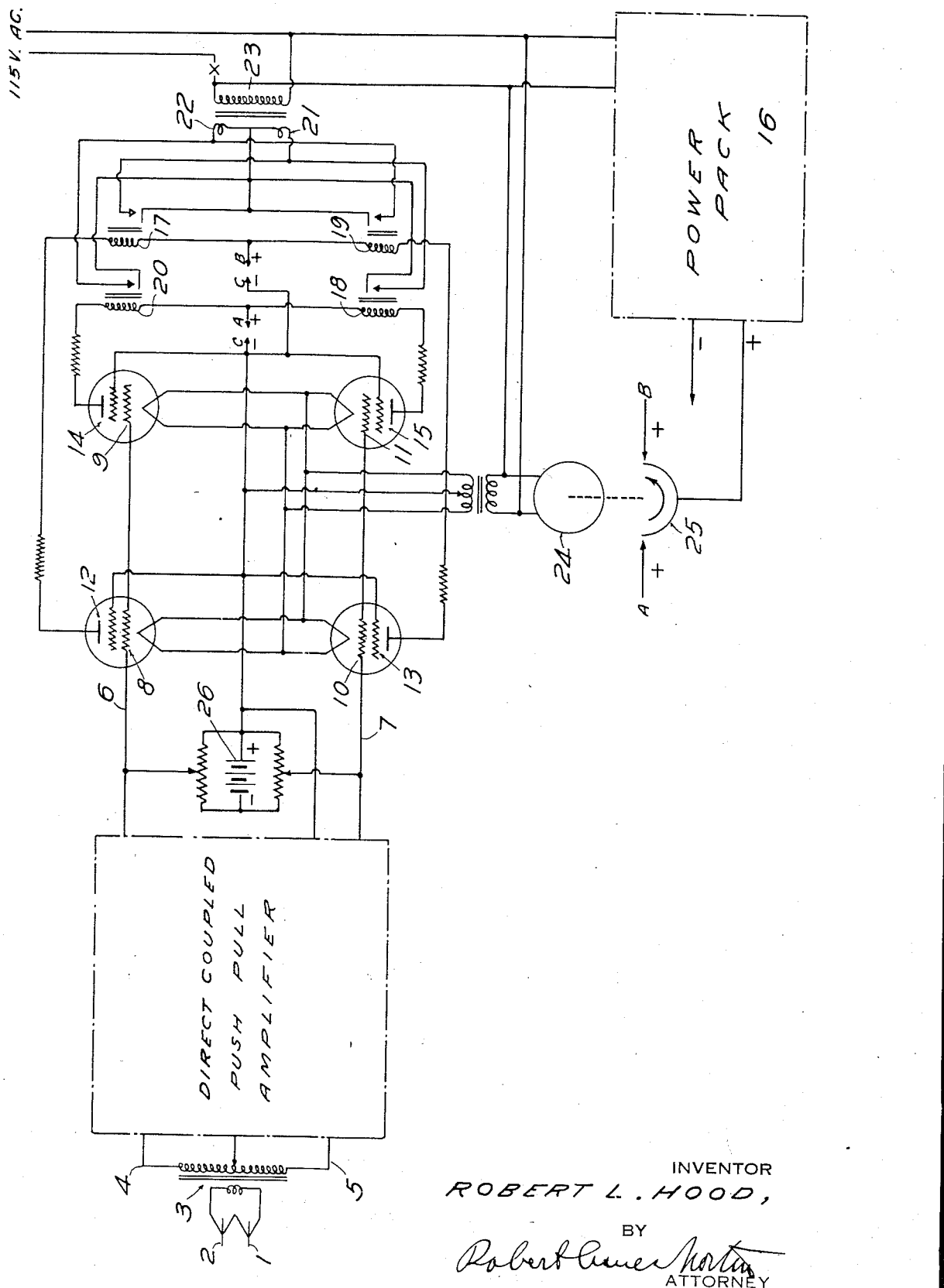
INVENTOR
ROBERT L. HOOD,
BY
Robert *illegible signature*
ATTORNEY Patented Oct. 10, 1944

2,359,734

UNITED STATES PATENT OFFICE 2,359,734

SPECTROPHOTOMETER AMPLIFIER

Robert L. Hood, Stamford, Conn., assignor to American Cyanamid Company, New York, N. Y., a corporation of Maine Application July 31, 1942, Serial No. 453,002

4 Claims. (Cl. 172—239)

This invention relates to an amplifying system for a recording infrared spectrophotometer.

Automatic recording spectrophotometers for the visual near infrared have achieved enormous practical success. These instruments are based on a flickering beam principle and rapidly draw spectral reflectance and transmission curves of samples. A typical instrument of this type is described and claimed in the patent to Pineo No. 2,107,836, issued February 8, 1938. By the use of suitable linkages between recording drives and photometering elements, it is possible to draw curves which are invariant in shape with changes in color concentration. Such improved instruments are described in the patents to Pineo No. 2,218,357, dated October 15, 1940, and 2,176,013, dated October 10, 1939.

Essentially the visual instrument depends on splitting a beam of monochromatic light into two beams, causing the beams to flicker and when the light in one beam differs from the other to impress an alternating current voltage on a high gain amplifier, the output of which turns a motor sharply tuned to flicker frequency which serves to vary the light in one of the beams in order to again create a balance. The motor drives recording means and in this manner a record of the degree of unbalance at any particular wave length is obtained.

Infrared spectrophotometry offers many important advantages in the analysis of chemical compounds and for many other fields of research and measurement. However, infrared spectrophotometers up to the present time have not been capable of making rapid automatic records of transmission changes at the different wave lengths and hence have been much less efficient and more time consuming than the highly perfected flickering beam visual spectrophotometers.

The proposals to adopt a flickering beam system for infrared have encountered serious difficulties. In visual instruments it is possible to use polarization causing one beam to flicker in opposite phase to the second beam. Polarization flickering is not suitable for infrared work except in the near infrared and a much more important drawback is the fact that it is not possible to use in the far infrared phototubes such as are used in the visual range which respond immediately to changes in light, and thus permit a flicker frequency sufficiently high for stable amplification and sharp selective tuning of motors driven by the amplified signals produced by unbalance. In ordinary practice in visual instruments flicker frequency is in the order of 60 cycles. In the infrared different types of radiation detectors must be employed and the most satisfactory of these are thermocouples which can be constructed of high sensitivity. However, these thermocouples are normally not responsive to rapid alterations in radiant energy and will not respond to radiant energy alternations of more than a few cycles, for example from one cycle per second up to a maximum of about 8 or 10. Thermocouples also are of very low impedance and are not suitable for generating a signal to be applied to the input of a high gain alternating current amplifier.

Another serious difficulty in flickering beam infrared spectrophotometers arises from the amount of energy available. In visual instruments the amount of light in the flickering beam is sufficient to operate integrating devices with fair efficiency. In the infrared, however, the amount of energy in any narrow wave length band, particularly in the far infrared, is not sufficient to permit efficient operation of ordinary integrating devices and it is therefore necessary to cause the beams to impinge directly on separate thermocouples.

The present invention may be used with any type of flickering beam infrared instrument in which two beams are available which can be caused to flicker. It is not necessary and in fact, not even desirable, that they flicker in opposite phases as is necessary in the visual instruments using polarization. On the contrary, it is sufficient if the beams flicker at a suitable frequency in the same phase which can be very simply effected by any mechanical flickering device imposed between the source of radiant infrared energy and the optics of the infrared spectrophotometer.

The invention is not limited to any particular infrared instrument and can operate on any instrument which emits two flickering beams, one of which has passed through a sample.

The present invention can be more thoroughly understood in conjunction with the drawing showing in diagrammatic form the electrical circuits and some of the elements of the instrument.

In the drawing the two flickering beams from any type of infrared spectrophotometer, one of which is passed through the sample to be analyzed, are caused to strike thermocouples 1 and 2 opposing each other. It is immaterial whether the beams flicker in the same phase or not, and for simplicity's sake they will be considered as flickering in the same phase by simple mechanical flickering devices of conventional design.

The thermocouples are preferably matched, at least roughly, although it is an important advantage of the present invention that an exact match is not necessary as adjustment for zero on the recorder can be effected by suitable adjustments on the recorder drive. It is, however, desirable to have the thermocouples comparable in characteristics so that no wide variations are encountered in their response to energy changes and therefore a fair degree of matching is desirable, although not essential.

The output of the differentially connected thermocouples is fed into a primary of a step up transformer 3 having an enormous turns ratio between primary and secondary. Wires 4 and 5 from the extremities of the transformer secondary are led to grids of a multistage push pull direct coupled amplifier as indicated on the drawing. In practice with presently available types of thermocouples, at least 3 stages of direct coupled amplification is normally necessary. The invention is not concerned with the design of the direct current amplifier which is of conventional design and is illustrative of any amplifier capable of faithful amplification at extremely low frequency such as one to ten cycles.

The output of the direct coupled amplifier is fed through wires 6 and 7 to the grids 8 and 10 of two thyratron tubes 12 and 13 biased by the battery 26 and these grids are directly connected respectively to the grids 9 and 11 of another pair of thyratron tubes 14 and 15. 115 volt alternating current is transformed by power pack 16 into rectified direct current, the high voltage end of which goes to a split contact disc 25 rotated by the synchronous motor 24, which motor rotates at flicker frequency. Low potential from direct current goes to the common point marked C connected to the screen grids of the thyratrons and the biasing battery. The split disc 25 alternately connects high potential direct current to the contact 5 from one-half cycle and the contact B with the other half cycle. The alternating current is also applied to the field of a shaded pole motor 23 provided with two shading coils 21 and 22.

Assuming that the flickering beams of infrared radiation on thermocouples 1 and 2 are exactly equal, there will be no alternating components on the transformer 3, hence no amplified potential on the grids of the thyratron tubes which will therefore not operate. As both shading coils 21 and 22 in this position are open circuited and the motor 23 will not run in either direction. Assuming now that the intensity of the beam striking thermocouple 2 is stronger than that striking thermocouple 1, then each pulsation of the flickering beams will cause a pulsating current in the primary transformer 3 and will drive positive through the wire 5, the grid of one of the tubes of the direct coupled amplifier. In the case of a three stage amplifier, this will cause the grids 8 and 9 of thyratrons 12 and 14 to become positive. If then the disc 25 connects the high potential D. C. to the point B, current will flow to the plate of thyratron 12 and this tube will ignite. Tubes 13 and 15 will not ignite because their grids are negative nor will tube 14 because it has no potential on its plate. As a result current will flow through relay 17 which will short circuit shading coil 21. Motor 23 will then start to turn. During the next half cycle grids 10 and 11 of thyratrons 13 and 15 become positive and the disc 25 will have turned so that the contact A is connected to a high potential. As a result, thyratron 15 will ignite, thyratron 13 will not ignite because it has no potential on its plate, and tubes 12 and 14 have negative grids. Current will therefore flow through a relay 18 which short circuit the same shading coil 21 and causes the motor 23 to continue rotation in the same direction.

Motor 23 operates a conventional device for decreasing the strength of the beam striking thermocouple 2. This device is not shown. It is an element of all flickering beam spectrophotometers and its structural features form no part of the present invention. When motor 23 has turned for a sufficient time so that the beam striking thermocouple 2 has been reduced in intensity to that of beam 1, no signal will be impressed on the direct coupled amplifier, the relays short circuiting shading coil 21 will both be de-energized and the motor will stop. The recording pen is connected to the drive from the motor 23 in a conventional manner and will record the amount of rotation of the motor required to compensate the unbalance of the beams.

If then the relation between the beams striking thermocouples 1 and 2 changes so that thermocouple 1 receives more light than thermocouple 2, the amplified signals will be in opposite phase and the grids 10 and 11 will be positive at a time when the disc 25 connects point B with the high D. C. potential. Thyratron 13 will then ignite and current will flow through the relay 19 short circuiting shading coil 22 and causing the motor 23 to turn in the opposite direction. In the next half cycle when grids 8 and 9 are positive and point A is connected to D. C. high potential through the disc 25 thyratron 14 will ignite, current will flow through the relay 20 which will continue to short circuit shading coil 22 and the motor 23 will continue to rotate in the same direction until the unbalance in the beams has been equalized.

The present invention is applicable to infrared apparatus with a frequency as low as one cycle, the motor running smoothly even at this low frequency and in fact, even lower frequencies may be used, but are normally undesirable as they adversely affect the speed of the machine since it takes at least half a cycle to reverse. It is desirable therefore where thermocouples are available which will respond to somewhat higher frequencies, for example about 5 cycles, to use such higher frequencies as the speed of the instrument is very greatly increased. It is an advantage of the present invention that it is applicable to any frequency which the thermocouples can handle.

The primary field of utility of the present invention is with flickering beam infrared spectrophotometers because there is no equally satisfactory and reliable alternative means for solving the difficult problems presented. However, it should be noted that the present invention is in no sense limited to infrared spectrophotometers or to amplifying systems using thermocouples. On the contrary, the invention is applicable to measurements in the visual spectrum where either photocells or preferably phototubes are used. In the latter case, the transformer 3 would not be necessary because the impedance of phototubes is already high enough to operate satisfactorily vacuum tube amplifiers. In the visual range it is not necessary to use the present invention, as other satisfactory devices are available. However, the use of the present invention does permit the construction of visual instruments having greatly simplified optics because it is no longer necessary to flicker the beams in opposite phase as is the case in the normal type of visual range recording spectrophotometer where light from flickering beams is integrated and the simple mechanical flickering of the beams may be employed which is characteristic of the present invention. Thus for certain operations in the visual range, the present invention can be used to advantage, and in its broader aspects its use is not limited to the infrared.

It is, of course, possible to use the present invention in spectrophotometers in the ultraviolet. In fact, flickering beam spectrophotometers using the present invention are limited only by the availability of radiation detectors and this is one of the important advantages of the present invention, that it is applicable to practically any radiation detectors which are capable of transforming radiant energy into electrical output regardless of the impedance characteristics of these detectors.

The direct coupled amplifier described in the preferred form of the present invention applicable to infrared spectrophotometry, is in no sense a limitation. On the contrary, any suitable amplifier may be used capable of a full wave voltage output. Where higher frequencies are available more common types of amplifiers may be used and even with the extremely low frequencies necessitated by radiation detectors of the thermocouple type, it is feasible to utilize any amplifier which will give stable and sufficient amplification at the low frequencies. In practice I have found that direct coupled, push-pull amplifiers are preferable because of their high degree of stability and for use with radiation detectors of low frequency response such amplifiers are preferred.

I claim:

1. A device for transforming differential intensities of flickering beams of radiant energy into rotation comprising in combination a pair of radiation detectors capable of transforming radiant energy into electrical energy connected in opposition, one detector being located in one flickering beam and the other in the other, and a thermionic amplifier capable of stable amplification at flicker frequency and capable of producing a full wave alternating current output, means for impressing the differential output of said opposed radiant energies detectors on the input of the amplifier, two pairs of thyratron tubes, each pair having interconnected control grids, output connections from the amplifier impressing the one side of the output wave on the control grids of one pair of thyratrons and the other side on the other pair, a shaded pole reversible motor, a source of high potential direct current, a switching device operating at flicker frequency and capable of switching the high direct current potential to the plates of one thyratron tube in each pair during one-half cycle and switching the direct current potential to the plates of the other two thyratron tubes during the remaining half cycle, relay means associated with the plate circuits of the four thyratron tubes and adapted to short circuit one shading coil when a flicker frequency signal of one phase is impressed on the thermionic amplifier and to short circuit the other shading coil when a flicker frequency signal of the opposite phase is impressed on the thermionic amplifier.

2. A device for transforming differential intensities of flickering beams of radiant energy into rotation comprising in combination a pair of radiation detectors capable of transforming radiant energy into electrical energy connected in opposition, one detector being located in one flickering beam and the other in the other, a thermionic amplifier capable of stable amplification at flicker frequency and capable of producing a full wave alternating current output, means for impressing the differential output of said opposed radiant energies detectors on the input of the amplifier, two pairs of thyratron tubes, each pair having inter-connected control grids, output connections from the amplifier impressing the one side of the output wave on the control grids of one pair of thyratrons and the other side on the other pair, a shaded pole reversible motor, connections from the plate of one thyratron of each pair to the plate of one thyratron of the opposite pair, and a second connection connecting the plate of the other thyratron of the first pair to the plate of the remaining thyratron of the second pair, each of said connections passing in series through two relay coils, a source of high potential direct current, a switching device operated at flicker frequency and capable of switching the high direct current potential to the midpoint between the relay coils in one thyratron plate connection during one half cycle and the midpoint between the relay coils of the other thyratron plate connection during the remaining half cycle, the relay coil between the midpoint and the thyratron plate of one pair and the relay coil between the other midpoint and the thyratron plate of one of the thyratrons of the other pair both operating short circuiting relays capable of short circuiting the same shading coil on the shaded pole motor and the remaining two relay coils operating relays to short circuit the other shading coil, whereby the shaded pole motor rotates in one direction when a flicker frequency signal of one phase is impressed on the thermionic amplifier and in the opposite direction when a signal of the opposite phase is applied.

3. A device for transforming differential intensities of flickering beams of radiant energy into rotation comprising a pair of thermocouples connected in opposition, one locked in one flickering beam and the other in the other, a thermionic amplifier capable of stable amplification at flicker frequency and capable of producing a full wave alternating current output, an impedance matching transformer representing the output of the thermocouples and constituting the input of the amplifier, two pairs of thyratron tubes, each pair having interconnected control grids, output connections from the amplifier impressing the one side of the output wave on the control grids of one pair of thyratrons and the other side on the other pair, a shaded pole reversible motor, a source of high potential direct current, a switching device operating at flicker frequency and capable of switching the high direct current potential to the plates of one thyratron tube in each pair during one-half cycle and switching the direct current potential to the plates of the other two thyratron tubes during the remaining half cycle, relay means associated with the plate circuits of the four thyratron tubes and adapted to short circuit one shading coil when a flicker frequency signal of one phase is impressed on the thermionic amplifier and to short circuit the other shading coil when a flicker frequency signal of the opposite phase is impressed on the thermionic amplifier.

4. A device for transforming differential intensities of flickering beams of radiant energy into rotation comprising a pair of thermocouples connected in opposition, one located in one flickering beam and the other in the other, a thermionic amplifier capable of stable amplification at flicker frequency and capable of producing a full wave alternating current output, an impedance matching transformer representing the output of the thermocouples and constituting the input of the amplifier, two pairs of thyratron tubes, each pair having interconnected control grids, output connections from the amplifier impressing the one side of the output wave on the control grids of one pair of thyratrons and the other side on the other pair, a shaded pole reversible motor, connections from the plate of one thyratron of each pair to the plate of one thyratron of the opposite pair, and a second connection connecting the plate of the other thyratron of the first pair to the plate of the remaining thyratron of the second pair, each of said connections passing in series through two relay coils, a source of high potential direct current, a switching device operated at flicker frequency and capable of switching the high direct current potential to the midpoint between the relay coils in one thyratron plate connection during one-half cycle and the midpoint between the relay coils of the other thyratron plate connection during the remaining half cycle, the relay coil between the midpoint and the thyratron plate of one pair and the relay coil between the other midpoint and the thyratron plate of one of the thyratrons of the other pair both operating short circuiting relays capable of short circuiting the same shading coil on the shaded pole motor and the remaining two relay coils operating relays to short circuit the other shading coil, whereby the shaded pole motor rotates in one direction when a flicker frequency signal of one phase is impressed on the thermionic amplifier and in the opposite direction when a signal of the opposite phase is applied.

ROBERT L. HOOD.